United States Patent

Ogura et al.

[15] 3,653,740
[45] Apr. 4, 1972

[54] PROJECTION SCREEN

[72] Inventors: Shuichi Ogura; Katsuhisa Ueda, both of Tokyo, Japan

[73] Assignee: Fuji Photo Film Co., Ltd., Kanagawa, Japan

[22] Filed: Aug. 14, 1969

[21] Appl. No.: 850,090

[30] Foreign Application Priority Data

Aug. 14, 1968 Japan...................................43/57754

[52] U.S. Cl.............................................................350/117
[51] Int. Cl.............................................................G03b 21/56
[58] Field of Search.........................................350/117–129; 29/470, 527.4

[56] References Cited

UNITED STATES PATENTS 3,507,548  4/1970  Hoffmann et al......................350/117
992,857   5/1911  Cooke et al...........................350/117
2,968,219  1/1961  Saiia.....................................350/117
3,314,742  4/1967  Morgan.................................350/117
3,372,971  3/1968  Quackenbush et al. ...............350/117

FOREIGN PATENTS OR APPLICATIONS 769,422  10/1967  Canada................................350/126

Primary Examiner—Louis R. Prince
Assistant Examiner—Joseph W. Roskos
Attorney—Sughrue, Rothwell, Mion, Zinn & Macpeak

[57] ABSTRACT

There is provided a projection screen comprising a support, a layer of double rolled aluminum foil having one smooth surface and one coarse surface, the smooth surface thereof being in contact with the support, and a brushed resin film on the coarse surface of said aluminum foil.

10 Claims, 1 Drawing Figure

PATENTED APR 4 1972　　　　　　　　　　　　　　3,653,740
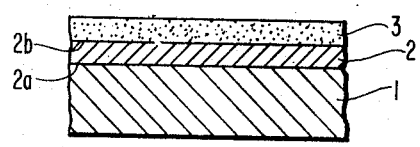
INVENTORS
SHUICHI OGURA
KATSUHISA UEDA
BY Sughrue, Rothwell, Mion,
　　Zinn & Macpeak
　　　　ATTORNEYS

PROJECTION SCREEN

BACKGROUND OF THE INVENTION

1. Field of the Invention

This invention relates to a projection screen. More particularly, it is concerned with a projection screen having excellent reflection directivity and a protected surface.

2. Description of the Prior Art

Since movie viewers generally spread out horizontally in front of a projection screen, it is desired that such screens possess a wide angle of reflectivity in the horizontal direction but a narrow one in the vertical direction. That is, horizontal directivity should be weak but vertical directivity should be strong. Generally, if the directivity of a projection screen is weakened so that the picture may be appreciated from a wide range of angles, the picture becomes dark, whereas if the picture is brightened by strengthening the directivity, it becomes difficult to view the picture from a wide range of angles. There was, at one time, no projection screen capable of satisfying all of these conditions.

We have formerly developed a projection screen which satisfies the above conditions, said projection screen consisting of aluminum foil, rolled by a double rolling method in a horizontal rolling direction, with reference to the finished projection screen, and a support member combined tightly with the smooth surface of said aluminum foil. This projection screen has excellent directivity, i.e., that which is weak and wide in the horizontal direction and strong and narrow in the vertical direction, as well as excellent brightness, as compared with known projection screens, whereby projection in the daytime is rendered feasible.

In the above double rolling method of producing such projection screens, two sheets of aluminum foil are compressively rolled in facing relationship to each other. Such double rolling results in two aluminum sheets, each of which possesses a coarse surface on one side and a smooth surface on the other. Projection screens can then be prepared therefrom by applying an aluminum sheet so prepared to a support so that the smooth side is in contact with the support and the coarse side is exposed, constituting the viewing surface.

However, the above-mentioned projection screen has the disadvantage that, due to the surface properties of the aluminum foil, the picture is often rendered indistinct by stains such as fingerprints or scratches.

SUMMARY OF THE INVENTION

It is the principal object of this invention to provide a projection screen, the surface of which is not easily stained or scratched and which possesses excellent directivity.

In order to accomplish the foregoing objects, we provide a brushed resin film on the surface of the rolled aluminum.

DETAILED DESCRIPTION OF THE INVENTION

The invention will be more fully understood by the following illustration when read in conjunction with the accompanying drawing which shows one embodiment of the projection screen according to this invention.

In this projection screen, an aluminum foil 2, rolled by a double rolling method in a horizontal rolling direction, is laminated onto a support 1 in such a manner that its smooth surface 2a is in contact with the support surface and a brushed resin film 3 is further laminated on the coarse surface 2b of said aluminum foil 2.

The brushed resin film employed in accordance with this invention may be obtained by dissolving a cellulose ester, such as cellulose nitrate, cellulose acetate or cellulose acetate butyrate, a cellulose ether such as ethyl cellulose, a linear polyester resin consisting mainly of a condensed ester of ethylene glycol and terephthalic acid, a vinyl chloride polymer, such as polyvinyl chloride, acrylic or methacyrlic polymers such as polymethyl methacrylate or polyethyl methacrylate, or mixtures of the above, in a mixture of a volatile organic solvent and nonsolvent miscible with said solvent and having less volatility than said solvent, coating the solution on the surface of the aluminum and drying. Alternatively, one or more of these resins may be dissolved in a water-soluble volatile organic solvent, coated on the aluminum in a relatively high humidity atmosphere and dried.

The lamination of the resin film on the aluminum foil, which is further laminated on a support, may be carried out either by applying a preformed, brushed resin film to the rolled aluminum foil or by coating a solution of the resin directly onto the rolled aluminum foil and then brushing. Particularly preferred resins are nitrocellulose, linear polyesters and mixtures thereof, which are excellent in adhesion to aluminum.

Typical of volatile organic solvents which may be employed are chloroform, dichloroethylene, trichloroethylene, dioxane, methyl acetate, ethyl acetate, acetone, benzene, isopropyl acetate and mixtures thereof.

Typical of nonsolvents, miscible with the volatile organic solvent and having less volatility than the same, which may be employed are petroleum fractions, particularly aliphatic hydrocarbons liquid at normal temperature, toluene, alcohols such as 2-ethoxyethanol, esters such as butyl acetate, butyl lactate and 2-ethoxyethyl acetate, and hydrogen.

The foregoing brushing may be carried out in the conventional manner well known to those skilled in the art and, accordingly, known solvents, nonsolvents and other conditions may be employed.

The rolled aluminum foil is prepared by inserting two aluminum sheets between two metallic rollers, adding an oil between the two aluminum sheets and pressing. One side of the thus obtained aluminum foil, i.e., that facing the roller, is obtained as a lustrous surface, while the other side, i.e., that facing the oil, is obtained as a coarse surface. In the present invention, the coarse surface is used as the screen surface upon which the picture is to be projected. The direction of rolling must be in the horizontal direction of the finished projection screen. As the support member for supporting the aluminum foil may be used smooth surfaced papers, natural and synthetic resins and the like.

The projection screen of this invention not only has excellent directivity in the horizontal direction, based on the coarse surface of the rolled aluminum foil, but also possesses the additional advantage that a picture projected on the screen is always very clear, since the surface is very resistant to stains and scratches due to the brushed resin film. Furthermore, the projection screen of this invention does not lose the desirable projection characteristics of the rolled aluminum foil, whereas projection screens having a non-brushed resin film applied thereto substantially lose the directivity of the aluminum foil.

Therefore, the projection screen of this invention is easy to handle and capable of easy use in the daytime.

The following example is given in order to illustrate the invention in detail without limiting the same.

EXAMPLE

The brightness and ease of staining and scratching were tested on three projection screens A, B and C. A was obtained by rolling aluminum sheets of 16 microns in thickness by a double rolling method to obtain an aluminum foil of 8 microns in thickness and laminating this aluminum foil on a sheet of paper. B was obtained by coating a 5 percent acetone solution of nitrocellulose onto the coarse surface of screen A to a thickness of 2 microns on a dry basis, drying the coating with air of 50 percent relative humidity at 30° C. and uniformly brushing the whole surface of the nitrocellulose layer. C was obtained by laminating a nonbrushed nitrocellulose layer on screen A. The results are shown below.

| Test No. | Brightness | Horizontal direction $\theta_H$ | | | Vertical direction $\theta_V$ | | | $\theta_H/\theta_V$ |
|---|---|---|---|---|---|---|---|---|
| | | $\theta 0.5$ | $\theta 0.05$ | $\theta 0.005$ | $\theta 0.5$ | $\theta 0.1$ | $\theta 0.005$ | |
| A | 14.0 | 16.0 | 33.0 | 38.0 | 7.0 | 15.0 | 19.0 | 2.28 |
| B | 12.0 | 15.1 | 38.1 | 45.5 | 7.2 | 17.9 | 24.1 | 2.1 |
| C | 27.5 | 2.7 | 17.5 | 29.8 | 1.8 | 11.8 | 18.6 | 1.5 |

In the above table, $\theta_H$ represents the horizontal angle in degrees away from a viewing point directly in front of the point of measurement to give the designated brightness. For example, an $\theta_H$ of 0.5 represents the viewing angle at which the brightness reflected in the horizontal direction is half the brightness obtained at a viewing point perpendicular from the screen at the point of measurement. Similarly, an $\theta_V$ of 0.5 represents the viewing angle at which the brightness in the vertical direction is half that obtained from a viewing point horizontal to the point of measurement. For example, an $\theta_V$ of 0.1 equaling 15° means that the brightness of a picture is 0.1 as much as when viewing from a position horizontal to the point of measurement, when the viewing angle is slanted up or down by 15 degrees. An $\theta_H/\theta_V$ of 0.5 represents the ratio of viewing angles in the horizontal and vertical directions where the brightness is half that as viewed directly. The larger this value, the stronger the directivity in the vertical direction as compared with the directivity in the horizontal direction.

Ease of spoiling by fingerprints*
A = 5
B = 3
C = 1

*The above numbers represent the relative brightness of the screens after having been impressed by the fingers 100 times, i.e., the image from screen A is 5 times as bright as that from screen C, etc.

Ease of scratching

The ease of scratching was tested by the use of iron pens of 2 g. and 5 g. in weight in both horizontal and vertical directions. The results are set forth in the table below, wherein O represents good resistance to scratching and X represents poor resistance to scratching.

| | Horizontal direction | Vertical direction |
|---|---|---|
| A | X (2 g.) | O (2 g.) |
| B | O (5 g.) | O (5 g.) |
| C | O (5 g.) | O (5 g.) |

It will be understood from the foregoing results that, considering the brightness, horizontal directivity and ease of staining and scratching tests together, the projection screen of this invention, possessing the brushed resin layer, is clearly superior, both to the uncoated screen and that coated with an unbrushed resin coating.

What is claimed is:

1. A projection screen comprising a support, a layer of double rolled aluminum foil having one smooth surface and one coarse surface, the smooth surface thereof being in contact with the support, and a brushed resin film on the coarse surface of said aluminum foil, said brushed resin film being obtained by dissolving at least one resin of the group consisting of cellulose nitrate, cellulose acetate, cellulose acetate butyrate, a linear polyester resin, ethyl cellulose, a vinyl chloride polymer, a polymethyl methacrylate and a polyethyl methacrylate in a member selected from the group consisting of a water-miscible volatile organic solvent and a mixture of a volatile organic solvent and a non-solvent, miscible with said organic solvent and having a lower volatility than said organic solvent.

2. The projection screen of claim 1, wherein the brushed resin film is a preformed brushed resin film which has been applied to said layer of aluminum foil.

3. The projection screen of claim 1 wherein said volatile organic solvent is selected from the group consisting of chloroform, dichlorethylene, trichloroethylene, dioxane, methyl acetate, ethyl acetate, acetone, benzene and isopropyl acetate.

4. The projection screen of claim 1, wherein said non-solvent is selected from the group consisting of liquid aliphatic hydrocarbons, toluene, 2-ethyoxyethanol, butyl acetate, butyl lactate and 2-ethoxyethyl acetate.

5. The process of preparing a projection screen comprising
  a. double rolling two aluminum foil sheets to obtain rolled aluminum foil sheets having one coarse surface and one smooth surface;
  b. applying a rolled aluminum foil sheet so obtained to a support so that the smooth surface of said rolled aluminum foil sheet is in contact with said support; and
  c. applying to the coarse surface of said rolled aluminum foil sheet a brushed resin film, said brushed resin film being obtained by dissolving at least one resin of the group consisting of cellulose nitrate, cellulose acetate, cellulose acetate butyrate, a linear polyester resin, ethyl cellulose, a vinyl chloride polymer, a polymethyl methacrylate and a polyethyl methacrylate in a member selected from the group consisting of a water-miscible volatile organic solvent and a mixture of a volatile organic solvent and a non-solvent, miscible with said organic solvent and having a lower volatility than said organic solvent, coating the solution on said layer of aluminum foil, and drying.

6. The process of claim 5 wherein the brushed resin film is a preformed brushed resin film which has been applied to said layer of aluminum foil.

7. The process of claim 5 wherein brushing is carried out after application of said resin film to said aluminum foil and before said resin film has dried.

8. The process of claim 5 wherein said member is a water-miscible volatile organic solvent and the drying is carried out in a high humidity atmosphere.

9. The process of claim 5 wherein said volatile organic solvent is selected from the group consisting of chloroform, dichloroethylene, trichloroethylene, dioxane, methyl acetate, ethyl acetate, acetone, benzene and isopropyl acetate.

10. The process of claim 5 wherein said non-solvent is selected from the group consisting of liquid aliphatic hydrocarbons, toluene, 2-ethyoxyethanol, butyl acetate, butyl lactate and 2-ethoxyethyl acetate.

* * * * *